United States Patent
Brown

(10) Patent No.: US 6,362,247 B1
(45) Date of Patent: Mar. 26, 2002

(54) METHOD OF IMPROVING STABILITY OF AROMATIC POLYCARBODIIMIDES

(75) Inventor: Ward Thomas Brown, North Wales, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/567,168

(22) Filed: May 8, 2000

(51) Int. Cl.⁷ ................................................ C08G 18/77
(52) U.S. Cl. ...................................... 521/160; 521/155
(58) Field of Search ...................... 564/252; 521/108, 521/155, 160

(56) References Cited

U.S. PATENT DOCUMENTS

| | | |
|---|---|---|
| 2,666,787 A | 1/1954 | Krzikalla |
| 2,853,473 A | 9/1958 | Campbell et al. |
| 2,941,966 A | 6/1960 | Campbell |
| 2,941,983 A | 6/1960 | Smeltz |
| 3,484,466 A | 12/1969 | Sayigh et al. |
| 3,755,242 A | 8/1973 | Reich ........................ 260/37 N |
| 3,929,733 A | 12/1975 | Alberino et al. ........ 260/77.5 R |
| 4,014,935 A | 3/1977 | Ibbotson |
| 4,085,140 A | 4/1978 | Ibbotson ................. 260/566 R |
| 4,487,964 A | 12/1984 | Watson, Jr. et al. |
| 4,614,785 A | 9/1986 | Richter et al. |
| 4,743,626 A * | 5/1988 | Narayan |
| 5,202,358 A | 4/1993 | Scholl et al. |
| 5,574,083 A | 11/1996 | Brown et al. |

FOREIGN PATENT DOCUMENTS

DE 28 37 770 A1 8/1978

OTHER PUBLICATIONS

Ulrich, H., "The Chemistry of Sulfonyl Isocyanates," *Chem. Rev.*, vol. 65, pp. 369–376., 1964.

* cited by examiner

Primary Examiner—Jean F. Vollano

(57) ABSTRACT

A method of improving the stability of ar-pCDI formed using phosphorous oxide catalysts by deactivating the catalyst by addition to the ar-pCDI of at least one catalyst poison is disclosed.

7 Claims, No Drawings

METHOD OF IMPROVING STABILITY OF AROMATIC POLYCARBODIIMIDES

This invention relates to a method of improving the stability of aromatic polycarbodiimides. More particularly, this invention relates to a method of improving the stability of aromatic polycarbodiimides using catalyst poisons.

Aromatic polycarbodiimides (hereinafter referred to as "ar-pCDI") are used as crosslinkers in a variety of applications, including coatings, adhesives, caulks, mastics, and the like. Generally, ar-pCDI are made by heating aromatic isocyanates in the presence of phosphorous oxides, usually phospholene oxides such as 3-methyl-1-phenyl-2-phospholene-1-oxide (hereinafter referred to as "MPPO"). The phosphorus oxides catalyze the reaction between 2—NCO groups to make a carbodiimide (hereinafter referred to as "CDI") and $CO_2$:

$$2R-NCO \rightarrow R-N=C=N-R+CO_2$$

The catalyst reacts with —NCO to form a phosphinimide and carbon dioxide:

$$R'NCO+R_3P=O \rightarrow R_3P=NR'+CO_2$$

that then reacts with another R'NCO to regenerate the catalyst and make CDI:

$$R_3P=NR'+R'NCO \rightarrow R'N=C=NR'+R_3P=O.$$

After they are made, the ar-pCDI molecules begin to slowly build viscosity until they gel. While not wishing to be bound by theory, it is believed that the residual phosphorous oxide present in ar-pCDI solutions catalyze the reaction between the ar-pCDI and any compounds containing active hydrogens such as water, alcohols, amines, and other materials bearing active hydrogens that may contaminate the ar-pCDI solutions:

$$N=C=N+ROH \rightarrow N=C(OR)NH$$

Over time, the accumulation of N=C(OR)NH causes the ar-pCDI to build viscosity and eventually gel.

This instability limits the usefulness of ar-pCDI because the shelf life is too short, i.e., less than six months, to be commercially viable. Aliphatic pCDI do not suffer the same stability problems as ar-pCDI, but, inter alia, are too reactive to make good crosslinkers for water-borne coatings when compared with ar-pCDI. Thus, ar-pCDI would be preferred if the shelf-life stability problems could be solved.

I have discovered that the stability or gel time of ar-pCDI is dependent on the level of phosphorous oxide used to make it and that remains in the ar-pCDI after manufacture; the more phosphorous oxide, the shorter the gel time. I have further discovered a way to deactivate these catalysts. Certain chemicals, hereinafter referred to as "catalyst poisons," may be added to the ar-pCDI after it is made that will react with the catalyst to deactivate it, thus greatly extending the storage stability or shelf-life of the ar-pCDI.

These catalyst poisons are not novel. For example in U.S. Pat. No. 5,202,358, U.S. Pat. No. 4,014,935, and U.S. Pat. No. 4,614,785, organic isocyanates containing carbodiimides and/or uretone imine groups are prepared by the partial polymerization of the —NCO groups using phosphorous oxide .catalysts. When only partial conversion takes place, the carbodiimides react with further isocyanate groups to give uretone imine groups. To ensure only a partial polymerization of the —NCO groups, U.S. Pat. No. 5,202,358 discloses the addition of silylated acid compounds of the formula X—[Si(CH$_3$)$_3$]$_n$ to the reaction to terminate the formation of carbodiimide groups. To ensure only a partial polymerization of the —NCO groups, U.S. Pat. No. 4,014,935 discloses that the phosphorous oxide catalyst is absorbed onto a substrate or deactivated by halides of hydrogen, tin, or phosphorus, or the oxyhalide of phosphorus or sulfur. To ensure only a partial polymerization of the —NCO groups, U.S. Pat. No. 4,614,785 discloses that the phosphorus oxide catalyst is deactivated with sulfonyl isocyanates.

In each of the above-referenced patents, the starting material is an isocyanate catalyzed by a phosphorous oxide. Only a partial reaction is desired so that the final product is a mixture. However, the presence of the residual phosphorous oxide leads to an undesired, complete reaction. The deactivation of the catalyst, either by adsorption onto a substrate or by the addition of a catalyst poison, prevents complete conversion to the pCDI. The present invention utilizes the deactivation steps but their purpose is to prevent the residual phosphorous oxide in the completed reaction from gelling the system rather from preventing the completed reaction.

STATEMENT OF THE INVENTION

The invention is directed to a method of improving the stability of ar-pCDI formed using a phosphorous oxide catalyst including the step of deactivating the catalyst.

Preparation of ar-pCDI using phosphorous oxide catalysts may be by conventional means such as those methods disclosed in U.S. Pat. No. 2,853,473, U.S. Pat. No. 2,941,966, U.S. Pat. No. 2,941,983, U.S. Pat. No. 4,487,964 and U.S. Pat. No. 5,574,083. On completion of the preparation of ar-pCDI, the phosphorous oxide catalysts is deactivated by addition to the ar-pCDI of at least one catalyst poison.

Deactivation may be carried out by addition to the ar-pCDI of at least one catalyst poison. The catalyst poisons useful in the method of invention include sulfonyl isocyanates and silylated acids of the formula X—[Si(CH$_3$)$_3$]$_n$ where X represents the neutral acid residue obtained by removal of the acidic hydrogen atoms from an n-basic acid having a pKa value of at most 3, other than a hydrohalic acid, and n is an integer of 1 to 3.

Examples of suitable sulfonyl isocyanates include any inorganic or organic compounds which contain at least one structural unit corresponding to the following formula —SO$_2$—NCO. Organic sulfonyl isocyanates are preferably used, while those containing aromatically-bound isocyanatosulfonyl residues are particularly preferred. Processes for producing organic sulfonyl isocyanates of the type suitable for use in accordance with the invention and also their chemical behavior are comprehensively described by H. Ulrich in Chem. Rev. 65, pages 369–376, 1965. In addition, the production of aryl sulfonyl isocyanates is described in U.S. Pat. No. 2,666,787 and U.S. Pat. No. 3,484,466. According to the invention, it is possible to use aliphatic, cycloaliphatic and also aromatic mono- or polysulfonyl isocyanates, of which the following are mentioned by way of example: methyl sulfonyl isocyanate, butyl sulfonyl isocyanate, cyclohexyl sulfonyl isocyanate, chlorosulfone isocyanate, perfluorooctyl sulfonyl isocyanate, phenyl sulfonyl isocyanate, p-toluene sulfonyl isocyanate, benzyl sulfonyl isocyanate, p-chlorophenyl sulfonyl isocyanate, m-nitrophenylsulfonyl isocyanate, 2,5-dimethyl phenyl sulfonyl isocyanate, p-fluorophenyl sulfonyl isocyanate, 2,5-dichlorophenyl sulfonyl isocyanate, 3,4-dichlorophenyl sulfonyl isocyanate, p-bromophenyl sulfonyl isocyanate, p-methoxyphenyl sulfonyl isocyanate, p-nitrophenyl sulfonyl isocyanate and o-nitrophenyl sulfonyl isocyanate; m-phenylene disulfonyl diisocyanate, p-phenylene disulfonyl diisocyanate, 4-methyl-m-phenylene disulfonyl diisocyanate, 2-chloro-p-phenylene disulfonyl diisocyanate, 5-chloro-m-phenylene disulfonyl diisocyanate, 1,5-naphthylene disulfonyl diisocyanate, 3-nitro-p-phenylene disulfonyl diisocyanate, 4-methoxy-m-phenylene disulfonyl diisocyanate, 2,5-furandiyl-bis-(methylene-sulfonyl)-diisocyanate, 4,4'-bis-phenylene disulfonyl diisocyanate, 2,2'-dichloro-4,4'-biphenylylene-disulfonyl diisocyanate, 3,3'-dimethoxy-4,4'-biphenylylene-disulfonyl diisocyanate, (methylene-di-p-phenylene)-disulfonyl diisocyanate, (methylene-di-3,3'-dimethoxy-p-phenylene)-disulfonyl diisocyanate, (methylene-di-3,3'-dimethyl-p-phenylene)-disulfonyl diisocyanate and 2-methyl-p-phenylene disulfonyl diisocyanate; also sulfonyl isocyanates containing free NCO-groups such as m-isocyanatophenyl sulfonyl isocyanate, p-isocyanatophenyl sulfonyl isocyanate, 3-isocyanato-p-tolyl sulfonyl isocyanate, 5-isocyanato-o-tolyl sulfonyl isocyanate, 3-isocyanato-4-methoxyphenyl sulfonyl isocyanate, 4-isocyanato-3-chlorophenyl sulfonyl isocyanate, 4'-isocyanato-4-biphenylyl sulfonyl isocyanate, 4'-isocyanato-2,2'-dichloro-4-biphenylyl sulfonyl isocyanate, 4-isocyanato-3,3'-dimethoxy-4-biphenylyl sulfonyl isocyanate, α-(p-isocyanatophenyl)-p-tolyl sulfonyl isocyanate, α-(4-isocyanato-3-methoxyphenyl)-2-methoxy-p-tolyl sulfonyl isocyanate, α-( 4-isocyanato-m-tolyl)-2,4-xylyl sulfonyl isocyanate and 5-isocyanato-1-naphthyl sulfonyl isocyanate; or containing free isothiocyanate groups such as p-isothiocyanatophenyl sulfonyl isocyanate, m-isothiocyanatophenyl sulfonyl isocyanate, 3-isothiocyanate-4-methoxy phenyl sulfonyl isocyanate and 4-isothiocyanato-3-methyl phenyl sulfonyl isocyanate.

It is preferred to use sulfonyl isocyanates wherein the —$SO_2$—NCO group is directly attached to an aromatic radical. Phenyl sulfonyl isocyanate, p-chlorophenyl sulfonyl isocyanate and p-toluene sulfonyl isocyanate (tosyl isocyanate) are particularly preferred. In addition to the organic sulfonyl isocyanates mentioned by way of example, it is also possible in accordance with the invention to use inorganic sulfonyl isocyanates such as chlorosulfonyl isocyanate or sulfonyl diisocyanate. Oxy-sulfonyl isocyanates such as trimethyl silyloxy-sulfonyl isocyanate are also suitable.

Examples of suitable silylated acids of the formula X—$[Si(CH_3)_3]_n$ include silylated sulfonic acids, such as trifluoromethanesulfonic acid trimethyl silyl ester and methanesulfonic acid trimethylsilyl ester; and silylated esters of acids of phosphorous, such as phosphoric acid tris (trimethylsilyl ester) and phosphoric acid diethyl ester trimethylsilyl ester.

The catalyst poison may be added to the ar-pCDI at a molar ratio of 0.1:1 to 30:1 (catalyst poison:phosphorus oxide catalyst), preferably, 0.3:1 to 5:1. The catalyst poison may be added neat or as a solution in a suitable solvent.

Compositions containing ar-pCDI made by the method of the present invention are more stable to storage at room temperature, especially up to 6 months, and are more thermally stable at elevated temperatures, for example of up to 80–120° C. than those compositions containing ar-pCDI made by conventional methods.

Some embodiments of the present invention will now be described in detail in the following Examples.

EXAMPLES

Example 1

A 250 ml round bottom flask was outfitted with a magnetic stirrer, $N_2$ sparge tube, reflux condenser, and thermocouple. The flask was charged with 47.88 g tolylene diisocyanate (mixture of isomers; 80% 2,4-tolylene diisocyanate and 20% 2,6-tolylene diisocyanate), 32.2 g polyethylene glycol monomethyl ether (average molecular weight. =350 g/mole), and 5.0 g propylene glycol methyl ether acetate. Flask was flushed with $N_2$, then sparge rate set to 5 ml/min and flask heated to 80° C. for 1 hour. 5.45 g of a 2.04% solution of MPPO in propylene glycol methyl ether acetate and 59.6 g of propylene glycol methyl ether acetate was added and the flask heated to 120° C. for 3.25 hours. One hour into heating the flask at 120° C. the $N_2$ sparge was increased to 20 ml/min. The ar-pCDI solution was allowed to cool to room temperature. An IR spectrum taken of the product showed no residual —NCO groups. The ar-pCDI solution was placed in a series of glass vials and catalyst poisons were added as indicated in Table 1. Vials A and B were then placed on a hot plate and heated for 15 minutes on the hot plate's "high" setting. The vials were observed for an increase in viscosity, and the time to gellation was recorded. These results are also given in Table 1.

TABLE 1

| Vial ID | Level of ar-pCDI solution (g) | Catalyst poison | Level of catalyst poison (g) | Moles poison:moles MPPO | Heated | Days to gel |
|---|---|---|---|---|---|---|
| A | 20.54 | chlorosulfonyl isocyanate | 0.0229 | 2.1:1 | Yes | >455 |
| B | 19.38 | phosphoric acid tris(trimethyl-silyl ester) | 0.0306 | 1.3:1 | Yes | >455 |
| C | 20.40 | chlorosulfonyl isocyanate | 0.0184 | 1.7:1 | No | >455 |
| D | 22.12 | chlorosulfonyl isocyanate (33.7% solution in xylene) | 0.0137 | 1.1:1 | No | >455 |
| E | 21.39 | phosphoric acid tris(trimethyl-silyl ester) | 0.0326 | 1.3:1 | No | >455 |
| F* | 21.99 | — | — | 0 | No | 173 |
| G | 10.01 | chlorosulfonyl isocyanate (33.7% solution in xylene) | 0.0019 | 0.35:1 | No | >455 |

*Comparative example

Those ar-pCDI to which a catalyst poison had been added (Vials A, B, C, D, E and G) showed significant improvement in time to gel compared to the ar-pCDI to which catalyst poison had not been added (Vial F).

Example 2

A 500 ml kettle was outfitted with a magnetic stirrer, $N_2$ sparge tube, reflux condenser, and thermocouple. The kettle was charged with 203.35 g tolylene diisocyanate (mixture of isomers; 80% 2,4-tolylene diisocyanate and 20% 2,6-tolylene diisocyanate), 137.05 g polyethylene glycol monomethyl ether (average molecular weight =350 g/mole). Kettle was flushed with $N_2$, then sparge rate set to 2 ml/min and flask heated to 750° C. for 1 hour. 0.47 g of MPPO and 276.3 g of propylene glycol methyl ether acetate was added and the kettle heated to 120° C. for 3.5 hours. Two hours into heating the flask at 120° C the $N_2$ sparge was increased to 25 ml/min. The ar-pCDI solution was allowed to cool to room temperature. An IR spectrum taken of the product showed no residual —NCO groups. The ar-pCDI solution was placed in a series of glass vials and catalyst poisons were added as indicated in Table 2. Vials K, L, and M were then placed in a 120° C. oven for 30 minutes, then cooled to room temperature. The vials were observed for an increase in viscosity, and the time to gellation was recorded. These results are also given in Table 2.

TABLE 2

| Vial ID | Level of ar-pCDI solution (g) | Catalyst poison | Level of catalyst poison (g) | Moles poison:moles MPPO | Heated | Days to gel |
|---|---|---|---|---|---|---|
| H* | 25.0 | — | — | 0 | No | 209 |
| I | 25.0 | chlorosulfonyl isocyanate (33.7% solution in xylene) | 0.0600 | 1.3:1 | No | >427 |
| J | 25.0 | tosyl isocyanate (38.2% solution in xylene) | 0.0940 | 1.7:1 | No | >427 |
| K* | 25.0 | — | — | 0 | Yes | 162 |
| L | 25.0 | chlorosulfonyl isocyanate (33.7% solution in xylene) | 0.0500 | 1.1:1 | Yes | >427 |
| M | 25.0 | tosyl isocyanate (38.2% solution in xylene) | 0.0711 | 1.3:1 | Yes | 365 |

*Comparative example

Those ar-pCDI to which a catalyst poison had been added (Vials I, J, L and M) showed significant improvement in time to gel compared to the ar-pCDI to which catalyst poison had not been added (Vials H and K).

What is claimed is:

1. A method of improving the stability of an aromatic polycarbodiimides containing at least one phospholene oxide catalyst, comprising the step of deactivating said catalyst with a catalyst poison for said phospholene oxide, wherein said aromatic polycarbodiimide has an Infrared Spectrum showing no residual isocyanate groups; and wherein said deactivating step comprises adding to said aromatic polycarbodiimide at least one said catalyst poison selected from the group consisting of sulfonyl isocyanates and silylated acids of the formula X—[Si(CH$_3$)$_3$]$_n$ where X represents the neutral acid residue obtained by removal of the acidic hydrogen atoms from an n-basic acid having a pKa value of at most 3, other than a hydrohalic acid, and n is an integer of 1 to 3.

2. The method of claim 1 wherein said phospholene oxide is 3-methyl-1-phenyl-2-phospholene-1-oxide.

3. The method of claim 1 wherein said catalyst poison is added to said aromatic polycarbodiimide at a molar ratio of catalyst poison to phospholene oxide of 0.1:1 to 30:1.

4. A The method of claim 1 wherein said catalyst poison is a sulfonyl isocyanate selected from the group consisting of chlorosulfonyl isocyanate and tosyl isocyanate.

5. The method of claim 1 wherein said catalyst poison is a silylated ester of acids of phosphorous.

6. The method of claim 1 wherein said catalyst poison is phosphoric acid tris(trimethyl-silyl ester).

7. The method of claim 1, wherein said aromatic carbodiimide is a product of a completed reaction between two isocyanate groups;

wherein said completed reaction is catalyzed by said phospholene oxide catalyst; and wherein said phospholene oxide catalyst is residual catalyst from said completed reaction.

* * * * *